United States Patent
Li et al.

(10) Patent No.: US 12,196,721 B1
(45) Date of Patent: Jan. 14, 2025

(54) WIDE-TEMPERATURE-RANGE UNIAXIAL AND BIAXIAL COMPRESSION TEST DEVICE IN HIGH-PRESSURE HYDROGEN ENVIRONMENT

(71) Applicant: China Special Equipment Inspection & Research Institute, Beijing (CN)

(72) Inventors: Xiang Li, Beijing (CN); Shengpeng Zheng, Beijing (CN); Yitao Liu, Beijing (CN); Jiepu Li, Beijing (CN)

(73) Assignee: China Special Equipment Inspection & Research Institute, Beijing (CN)

( * ) Notice: Subject to any disclaimer, the term of this patent is extended or adjusted under 35 U.S.C. 154(b) by 0 days.

(21) Appl. No.: 18/778,280

(22) Filed: Jul. 19, 2024

(30) Foreign Application Priority Data

Feb. 20, 2024 (CN) .......................... 202410185854.5

(51) Int. Cl.
*G01N 3/10* (2006.01)

(52) U.S. Cl.
CPC ....... *G01N 3/10* (2013.01); *G01N 2203/0003* (2013.01); *G01N 2203/0019* (2013.01); *G01N 2203/0048* (2013.01); *G01N 2203/0067* (2013.01); *G01N 2203/0226* (2013.01); *G01N 2203/0228* (2013.01);
(Continued)

(58) Field of Classification Search
CPC ............. G01N 3/10; G01N 2203/0003; G01N 2203/0019; G01N 2203/0048; G01N 2203/0067; G01N 2203/0226; G01N 2203/0228; G01N 2203/0232;
(Continued)

(56) References Cited

U.S. PATENT DOCUMENTS

2019/0265138 A1    8/2019  Ma

FOREIGN PATENT DOCUMENTS

| CN | 206920243 U | 1/2018 | |
| CN | 105571942 B | * 7/2018 | ............... G01N 3/08 |

(Continued)

OTHER PUBLICATIONS

Notification to Grant Patent Right for Invention for Application No. 202410185854.5 mail date Mar. 28, 2024, 2 pages.

*Primary Examiner* — Jonathan M Dunlap
(74) *Attorney, Agent, or Firm* — Maine Cernota & Curran

(57) ABSTRACT

A wide-temperature-range uniaxial and biaxial compression test device in a high-pressure hydrogen environment is provided. An upper computer is interacted with a temperature sensor, a gas pressure sensor, test pressure sensors, displacement sensors, an oxygen/hydrogen concentration monitor, a hydrogen filling system, a vacuum extraction system, a DIC test system, and the other components. The upper computer is used to achieve high-pressure hydrogen environment wide-temperature-range uniaxial and biaxial compression test based on different test modes. Tested engineering stress-strain data is processed to obtain real stress-strain data of rubber, and then the real stress-strain data is processed through a corresponding database to screen out a constitutive model capable of best characterizing the nonlinearity of the rubber specimen. Meanwhile, a strain distribution nephogram generated by a test result of a sample material can be analyzed, thus obtaining a deformation behavior and a failure fracture mechanism of the sample material.

8 Claims, 2 Drawing Sheets

(52) U.S. Cl.
CPC ............... *G01N 2203/0232* (2013.01); *G01N 2203/0252* (2013.01); *G01N 2203/0254* (2013.01); *G01N 2203/0411* (2013.01); *G01N 2203/0647* (2013.01)

(58) Field of Classification Search
CPC ... G01N 2203/0252; G01N 2203/0254; G01N 2203/0411; G01N 2203/0647
See application file for complete search history.

(56) References Cited

FOREIGN PATENT DOCUMENTS

| | | | | | |
|---|---|---|---|---|---|
| CN | 110095340 | A | * | 8/2019 | ............... G01N 3/02 |
| CN | 117309616 | A | * | 12/2023 | |

* cited by examiner

WIDE-TEMPERATURE-RANGE UNIAXIAL AND BIAXIAL COMPRESSION TEST DEVICE IN HIGH-PRESSURE HYDROGEN ENVIRONMENT

CROSS-REFERENCE TO RELATED APPLICATION

This patent application claims the benefit and priority of Chinese Patent Application No. 202410185854.5 filed with the China National Intellectual Property Administration on Feb. 20, 2024, the disclosure of which is incorporated by reference herein in its entirety as part of the present application.

TECHNICAL FIELD

The present disclosure relates to the technical field of material testing, and in particular to a wide-temperature-range uniaxial and biaxial compression test device in a high-pressure hydrogen environment.

BACKGROUND

The traditional measurement methods include mechanical measurement and electrical measurement. However, these methods involve contact with materials and have certain requirements for the measurement environment, and thus are not suitable for high temperature measurement. Compared with the traditional measurement methods, electronic speckle interferometry (ESPI), fringe projection and other optical measurement methods can obtain the information of materials without making contact with the materials. However, optical measurement methods are not suitable for all high temperature measurements, with the reason that most of the optical measurement methods also have strict requirements on the measurement environment.

The existing compression test device in high-pressure hydrogen environment has a simple function, which can complete uniaxial compression testing at a specific temperature, but cannot meet the increasingly complex test tasks.

The post-processing of experimental results of the existing compression test device in high-pressure hydrogen environment is simple, and only the engineering stress-strain data obtained from rubber material test can be output. However, the authenticity and reliability of the data need to be verified.

SUMMARY

In order to solve the problems in the prior art, a wide-temperature-range uniaxial and biaxial compression test device in a high-pressure hydrogen environment is provided.

In order to achieve the purpose above, the present disclosure provides the following solutions.

A wide-temperature-range uniaxial and biaxial compression test device in a high-pressure hydrogen environment includes a test box, a temperature sensor, a gas pressure sensor, test pressure sensors, displacement sensors, an oxygen/hydrogen concentration monitor, an upper computer, a hydrogen filling system, a vacuum extraction system, and a Digital Image Correlation (DIC) test system. A sample clamping mechanism, a heating system and a cooling system are arranged in the test box.

The upper computer is electrically connected to the temperature sensor, the gas pressure sensor, the test pressure sensors, the displacement sensors, the oxygen/hydrogen concentration monitor, the hydrogen filling system, the DIC test system, the sample clamping mechanism, the heating system, the vacuum extraction system and the cooling system, respectively; the hydrogen filling system is connected to the test box through a pipeline; the temperature sensor, the gas pressure sensor and the oxygen/hydrogen concentration monitor are arranged inside the test box; the vacuum extraction system is connected to the hydrogen filling system and the test box through a pipeline, respectively.

A uniaxial compression test mode and a biaxial compression test mode are implanted in the upper computer; the upper computer is configured to acquire test parameters in the uniaxial compression test mode or the biaxial compression test mode, and to generate a test instruction based on the test parameters; the test instruction is configured to start the hydrogen filling system, the temperature sensor, the gas pressure sensor, the test pressure sensors, the displacement sensors and the oxygen/hydrogen concentration monitor; the test pressure sensors and the displacement sensors are arranged on the sample clamping mechanism.

The hydrogen filling system is configured to fill hydrogen into the test box; the upper computer is configured to generate a hydrogen filling instruction based on a gas pressure in the test box acquired by the gas pressure sensor; the hydrogen filling system is configured to execute the hydrogen filling instruction.

The upper computer is configured to acquire temperature data in the test box acquired by the temperature sensor, and to generate a heating/cooling instruction based on the temperature data; the heating system and the cooling system are configured to execute the heating/cooling instruction until temperature in the test box reaches a set value.

The upper computer is configured to generate a sample clamping instruction based on the test parameters; the sample clamping mechanism is configured to execute the sample clamping instruction; the upper computer is configured to acquire data acquired by the test pressure sensors and data acquired by the displacement sensors, and to determine a compression rate of a sample according to the data acquired by the test pressure sensors and the data acquired by the displacement sensors; when the compression rate of the sample reaches the set value, the upper computer generates a sample clamping stop instruction; the sample clamping mechanism is configured to execute the sample clamping stop instruction.

The DIC test system is configured to acquire sample image data during the test process; the upper computer is configured to determine stress-strain data of the sample based on the sample image data and the data acquired by the test pressure sensors, to obtain a constitutive model for characterizing nonlinearity of the sample by screening from a database based on the stress-strain data, and to generate a strain distribution nephogram of the sample based on the constitutive model, to analyze a change process of the strain distribution nephogram to obtain a deformation behavior and a failure fracture mechanism of a sample material.

The vacuum extraction system is configured to vacuumize the test box.

Alternatively, hydrogen filling system includes a nitrogen gas cylinder, a hydrogen gas cylinder, a buffer tank, a first tee joint, and a second tee joint.

The nitrogen gas cylinder is connected to a first interface of the first tee joint through a pipeline; a gas molecular filter and a nitrogen manually-operated valve are arranged on the pipeline between the nitrogen gas cylinder and the first interface of the first tee joint in sequence; the hydrogen gas cylinder is connected to a second interface of the first tee joint through a pipeline, and a gas molecular filter and a hydrogen manually-operated valve are arranged on the pipeline between the hydrogen gas cylinder and the second interface of the first tee joint in sequence; a third interface of the first tee joint is connected to a pipeline of a cooler; the cooler is connected to the buffer tank through a pipeline; a pressure sensor, a pressure gauge, an electromagnetic pneumatic valve and a booster pump are arranged on the pipeline between the third interface of the first tee joint and the cooler in sequence; the buffer tank is connected to a first interface of the second tee joint through a pipeline.

A second interface of the second tee joint is connected to the test box through a pipeline, a further pressure sensor and a further pressure gauge are arranged on the pipeline connecting the second interface of the second tee joint and the test box, and a third interface of the second tee joint is connected to the vacuum extraction system through a pipeline.

Alternatively, the vacuum extraction system includes a vacuum pump, a third tee joint, and an exhaust port.

A first interface of the third tee joint is connected to the hydrogen filling system through a pipeline, a second interface of the third tee joint is connected to the vacuum pump through a pipeline, and a manually-operated valve and a vacuum gauge are arranged on the pipeline connecting the second interface of the third tee joint and the vacuum pump in sequence; a third interface of the third tee joint is connected to the exhaust port through a pipeline; and an emptying valve is arranged on the pipeline connecting the third interface of the third tee joint and the exhaust port.

Alternatively, the DIC test system includes a camera, and an illuminating lamp.

The camera is electrically connected to the upper computer, the camera is configured to shoot the sample image data during the test process, and the illuminating lamp is configured to provide an illuminating environment for the camera.

Alternatively, an optical filter is arranged in front of a lens of the camera.

Alternatively, an observation window is formed on the test box, the observation window is encapsulated by explosion-proof glass; and the camera is configured to shoot the sample image data during the test process through the observation window.

Alternatively, the sample clamping mechanism includes a first hydraulic telescopic rod, a second hydraulic telescopic rod, a third hydraulic rod, and a sample stage.

The first hydraulic telescopic rod, the second hydraulic telescopic rod and the third hydraulic rod are electrically connected to the upper computer; each of the first hydraulic telescopic rod, the second hydraulic telescopic rod and the third hydraulic rod is provided with a corresponding one of the test pressure sensors and a corresponding one of the displacement sensors; an end of the first hydraulic telescopic rod is fixed to the test box, and a first pressure plate is arranged on another end of the first hydraulic telescopic rod; an end of the second hydraulic telescopic rod is fixed to the test box, and a second pressure plate is arranged on another end of the second hydraulic telescopic rod; an end of the third hydraulic telescopic rod is fixed to the test box, and a third pressure plate is arranged on another end of the third hydraulic telescopic rod; an end of the sample stage is fixed to the test box, and a sample placement end surface is formed on another end of the sample stage; the first pressure plate and the sample placement end surface are arranged oppositely; and the second pressure plate and the third pressure plate are arranged oppositely.

Alternatively, the heating system includes multiple heating tubes, the multiple heating tubes are electrically connected to the upper computer, and the heating tubes are arranged on a box wall of the test box.

Alternatively, the cooling system includes a refrigerator, and the refrigerator is electrically connected to the upper computer, and the refrigerator is arranged inside the test box.

According to specific embodiments of the present disclosure, the present disclosure achieves the following technical effects. According to the wide-temperature-range uniaxial and biaxial compression test device in a high-pressure hydrogen environment, an upper computer is interacted with a temperature sensor, a gas pressure sensor, test pressure sensors, displacement sensors, an oxygen/hydrogen concentration monitor, a hydrogen filling system, a vacuum extraction system, a Digital Image Correlation (DIC) test system, and the other components, the hydrogen concentration inside the test box can be determined based on an oxygen/hydrogen concentration monitor, thereby achieving the detection of whether hydrogen is leaking or not. The upper computer is used to achieve high-pressure hydrogen environment wide-temperature-range uniaxial and biaxial compression test based on different test modes. Stress-strain data and a strain distribution nephogram is generated based on a test result, and the change process of the strain distribution nephogram is effectively analyzed, thus obtaining a deformation behavior and a failure fracture mechanism of the sample material.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those skilled in the art may still derive other drawings from these accompanying drawings without creative efforts.

Figure 1:
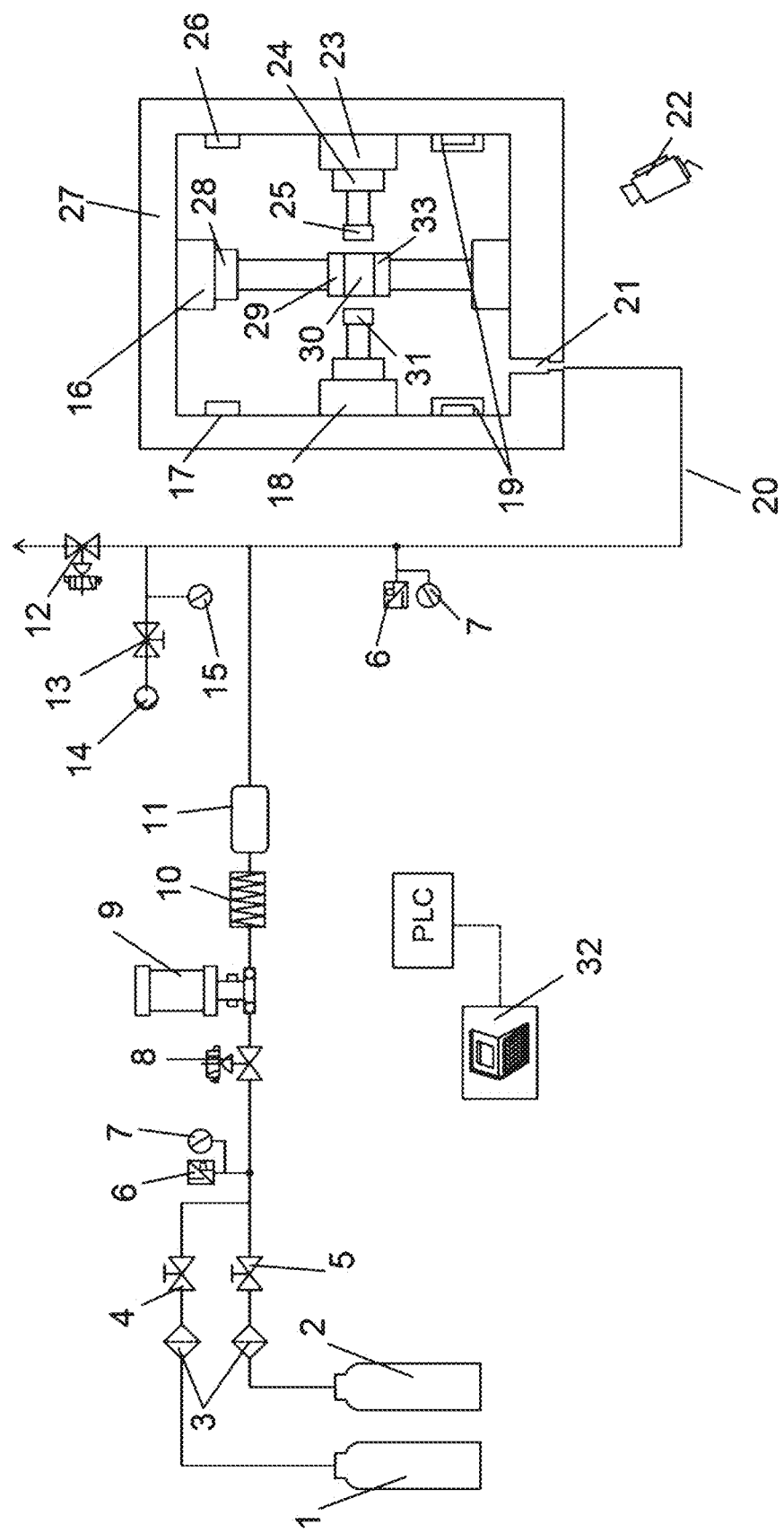
FIG. 1 is a structural schematic diagram of a wide-temperature-range uniaxial and biaxial compression test device in a high-pressure hydrogen environment according to the present disclosure.

In the drawings: 1 nitrogen gas cylinder; 2 hydrogen gas cylinder; 3 gas molecule filter; 4 nitrogen manually-operated valve; 5 hydrogen manually-operated valve; 6 pressure sensor; 7 pressure gauge; 8 electromagnetic pneumatic valve; 9 booster pump; 10 cooler; 11 buffer tank; 12 emptying valve; 13 manually-operated valve; 14 vacuum pump; 15 vacuum gauge; 16 first hydraulic telescopic rod; 17 temperature/gas pressure sensor; 18 second hydraulic telescopic rod; 19 heating tube; 20 gas inlet/outlet pipeline; 21 gas inlet/outlet; 22 camera; 23 third hydraulic telescopic rod; 24 first pressure/displacement sensor; 25 third pressure plate; 26 oxygen/hydrogen concentration monitor; 27 test box; 28 second pressure/displacement sensor; 29 first pressure plate; 30 sample; 31 second pressure plate; 32 upper computer; 33 sample placement end surface; 34 optical filter; 35 observation window; 36 illuminating lamp.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

A purpose of the present disclosure is to provide a wide-temperature-range uniaxial and biaxial compression test device in a high-pressure hydrogen environment, which can achieve wide-temperature-range uniaxial and biaxial compression test in a high-pressure hydrogen environment.

To make the purposes, features and advantages of the present disclosure more apparently and understandably, the following further describes the present disclosure in detail with reference to the accompanying drawings and the specific embodiments.

Figure 2:
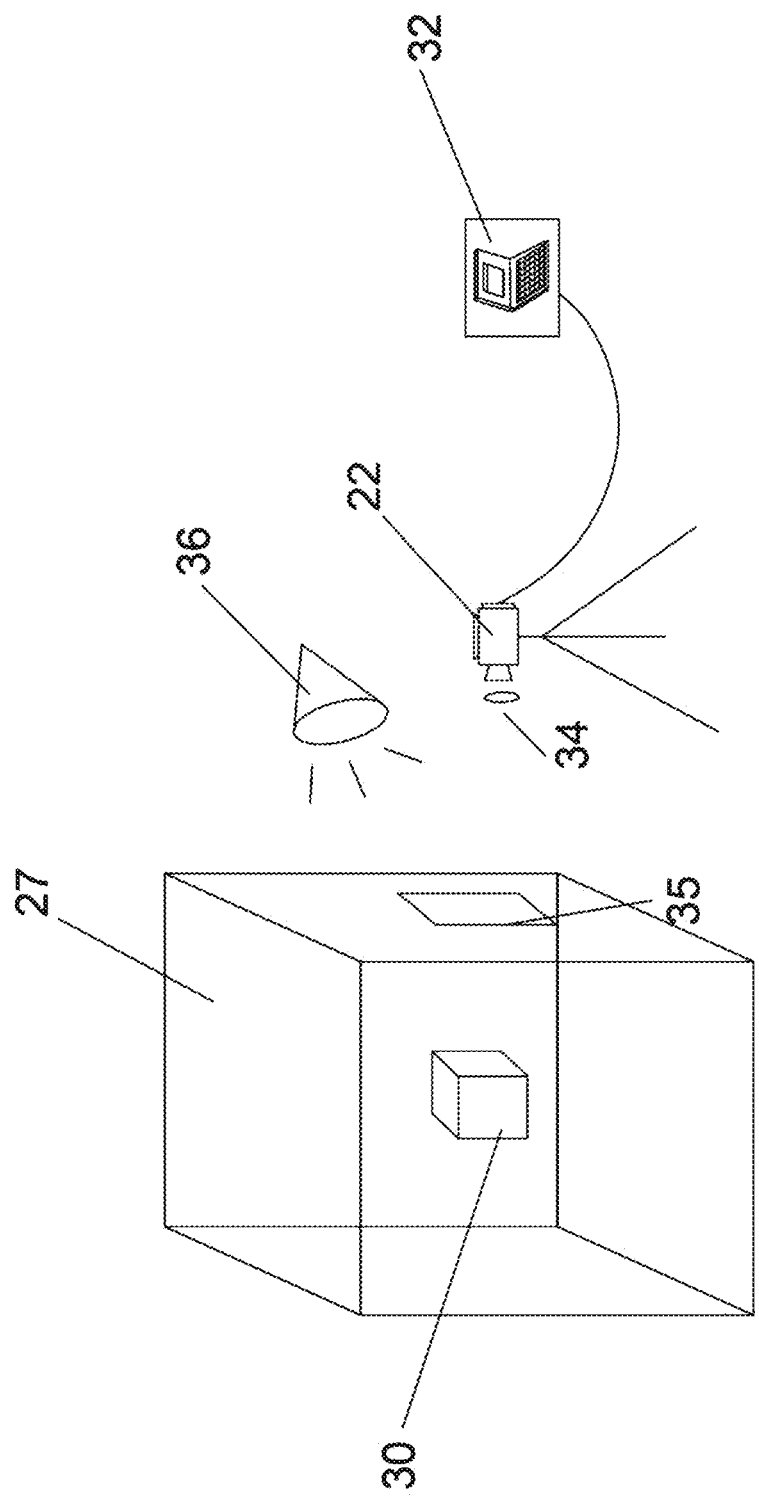
FIG. 2 is a schematic diagram of a DIC test system according to the present disclosure.

As shown in FIG. 1 and FIG. 2, the wide-temperature-range uniaxial and biaxial compression test device in a high-pressure hydrogen environment includes a test box 21, a temperature sensor, a gas pressure sensor, test pressure sensors, displacement sensors, an oxygen/hydrogen concentration monitor 26, an upper computer 32, a hydrogen filling system, a vacuum extraction system, and a DIC test system. A sample clamping mechanism, a heating system, and a cooling system are arranged in the test box 27. During actual application, the temperature sensor and the gas pressure sensor are integrated and then installed inside the test box. As shown in FIG. 1, the integrated temperature sensor and gas pressure sensor form a temperature/gas pressure sensor 17.

The upper computer 32 is electrically connected to the temperature sensor, the gas pressure sensor, the test pressure sensors, the displacement sensors, the oxygen/hydrogen concentration monitor 26, the hydrogen filling system, the DIC test system, the sample clamping mechanism, the heating system, the vacuum extraction system, and the cooling system, respectively. The hydrogen filling system is connected to the test box 27 through a pipeline. The temperature sensor, the gas pressure sensor and the oxygen/hydrogen concentration monitor 26 are arranged inside the test box 27. The vacuum extraction system is connected to the hydrogen filling system and the test box 27 through a pipeline, respectively.

A uniaxial compression test mode and a biaxial compression test mode are implanted in the upper computer 32. The upper computer 32 is configured to acquire test parameters in the uniaxial compression test mode or the biaxial compression test mode, and to generate a test instruction based on the test parameters. The test instruction is configured to start the hydrogen filling system, the temperature sensor, the gas pressure sensor, the test pressure sensors, the displacement sensors, and the oxygen/hydrogen concentration monitor 26. The test pressure sensors and the displacement sensors are arranged on the sample clamping mechanism.

The hydrogen filling system is configured to fill hydrogen into the test box 27. The upper computer 32 is configured to generate a hydrogen filling instruction based on a gas pressure in the test box 27 acquired by the gas pressure sensor. The hydrogen filling system is configured to execute the hydrogen filling instruction. A gas pressure change in the test box 27 can be observed through the gas pressure sensor arranged in the test box 27.

The upper computer 32 is configured to acquire temperature data in the test box 27 acquired by the temperature sensor, and to generate a heating/cooling instruction based on the temperature data. The heating system and the cooling system are configured to execute the heating/cooling instruction until temperature in the test box 27 reaches a set value.

The upper computer 32 is configured to generate a sample clamping instruction based on the test parameters. The sample clamping mechanism is configured to execute the sample clamping instruction. The upper computer 32 is configured to acquire data acquired by the test pressure sensors and data acquired by the displacement sensors, and to determine a compression rate of a sample 30 according to the data acquired by the test pressure sensors and the data acquired by the displacement sensors. When the compression rate of the sample 30 reaches the set value, the upper computer 32 generates a sample clamping stop instruction. The sample clamping mechanism is configured to execute the sample clamping stop instruction.

The DIC test system is configured to acquire sample image data during the test process. The upper computer 32 is configured to determine stress-strain data of the sample 30 based on the sample image data and the data acquired by the test pressure sensors, to obtain a constitutive model for characterizing nonlinearity of the sample by screening from a database based on the stress-strain data, and to generate a strain distribution nephogram of the sample 30 based on the constitutive model, to analyze a change process of the strain distribution nephogram to obtain a deformation behavior and a failure fracture mechanism of a sample material.

The vacuum extraction system is configured to vacuumize the test box 27.

During actual application, as shown in FIG. 1, the hydrogen filling system used in the present disclosure includes a nitrogen gas cylinder 1, a hydrogen gas cylinder 2, a cooler 10, a first tee joint, and a second tee joint.

The nitrogen gas cylinder 1 is connected to a first interface of the first tee joint through a pipeline, and a gas molecular filter 3 and a nitrogen manually-operated valve 4 are arranged on the pipeline between the nitrogen gas cylinder 1 and the first interface of the first tee joint in sequence. The hydrogen gas cylinder 2 is connected to a second interface of the first tee joint through a pipeline, and a gas molecular filter 3 and a hydrogen manually-operated valve 5 are arranged on the pipeline between the hydrogen gas cylinder 2 and the second interface of the first tee joint in sequence. A third interface of the first tee joint is connected to a cooler 10 through a pipeline; the cooler 10 is connected to the buffer tank 11 through a pipeline, and a pressure sensor 6, a pressure gauge 7, an electromagnetic pneumatic valve 8 and a booster pump 9 are arranged on the pipeline between the third interface of the first tee joint and the cooler 10 in sequence. The buffer tank 11 is connected to a first interface of the second tee joint through a pipeline.

A second interface of the second tee joint is connected to the test box 27 through a pipeline, and a pressure sensor 6 and a pressure gauge 7 are arranged on the pipeline connecting the second interface of the second tee joint and the test box 27. A third interface of the second tee joint is connected to the vacuum extraction system through a pipeline.

Further, in order to ensure the accuracy of a hydrogen concentration in the test box 27, as shown in FIG. 1, the vacuum extraction system used in the present disclosure includes a vacuum pump 14, a third tee joint, and an exhaust port.

A first interface of the third tee joint is connected to the hydrogen filling system through a pipeline, a second interface of the third tee joint is connected to the vacuum pump 14 through a pipeline, and a manually-operated valve 13 and a vacuum gauge 15 are arranged on the pipeline connecting the second interface of the third tee joint and the vacuum pump 14 in sequence. A third interface of the third tee joint is connected to the exhaust port through a pipeline, and an emptying valve 12 is arranged on the pipeline connecting the third interface of the third tee joint and the exhaust port.

Further, in order to improve image shooting efficiency and definition, as shown in FIG. 2, the DIC test system used in the present disclosure includes a camera 22, and an illuminating lamp 36.

The camera 22 is electrically connected to the upper computer 32. The camera 22 is configured to shoot sample image data during the test process. The illuminating lamp 36 is configured to provide an illuminating environment for the camera 22.

In order to eliminate a noise deviation and a difference deviation, an optical filter 34 is further arranged in front of a lens of the camera 22.

During actual application, the illuminating lamp 36 is used to illuminate the digital image correlation (DIC) test system. The camera 22 is used to capture an image, and after the noise deviation and the difference deviation are eliminated using the optical filter 34, the upper computer 32 is used to process an acquired image using an image gray average algorithm, and to compute the displacement and strain of the sample 30 during the compression process.

Further, in order to ensure the airtightness of an environment in the whole test box 27 and avoid a test error caused by hydrogen leakage, as shown in FIG. 2, an observation window 35 is formed on the test box 27, and the observation window 35 is encapsulated by explosion-proof glass. Based on such a structure, during actual application, the camera 22 is used to shoot the sample image data during the test process through the observation window 35.

In addition, in order to improve the security throughout the test process, a control panel is arranged on one side of a box door of the test box 27. The control panel is electrically connected to the upper computer 32, and a display screen, an over-temperature protector, a time accumulator, and an emergency stop button are arranged on the control panel.

Further, in order to ensure that the test parameters are accurately applied to the sample 30, as shown in FIG. 1, the sample clamping mechanism used in the present disclosure includes a first hydraulic telescopic rod 16, a second hydraulic telescopic rod 18, a third hydraulic telescopic rod 23, and a sample stage.

The first hydraulic telescopic rod 16, the second hydraulic telescopic rod 18 and the third hydraulic rod 23 are electrically connected to the upper computer 32. Each of the first hydraulic telescopic rod 16, the second hydraulic telescopic rod 18 and the third hydraulic rod 23 is provided with a corresponding one of the test pressure sensors and a corresponding one of the displacement sensors to accurately detect the displacement of each telescopic rod and the pressure applied to the sample 30. During actual application, the test pressure sensor and the displacement sensor are integrated. For example, as shown in FIG. 1, the test pressure sensor and the displacement sensor on the third hydraulic telescopic rod 23 are integrated to form a first pressure/displacement sensor 24. The test pressure sensor and the displacement sensor on the first hydraulic telescopic rod 16 are integrated to form a second pressure/displacement sensor 28.

In order to ensure the stability of sample clamping, during actual application, an end of the first hydraulic telescopic rod 16 is fixed to the test box 27, and a first pressure plate 29 is arranged on the other end of the first hydraulic telescopic rod 16. An end of the second hydraulic telescopic rod 18 is fixed to the test box 27, and a second pressure plate 31 is arranged on the other end of the second hydraulic telescopic rod 18. An end of the third hydraulic telescopic rod 23 is fixed to the test box 27, and a third pressure plate 25 is arranged on the other end of the third hydraulic telescopic rod 23. An end of the sample stage is fixed to the test box 27, and a sample placement end surface 33 is formed on the other end of the sample stage. The first pressure plate 29 and the sample placement end surface 33 are arranged oppositely; and the third pressure plate 25 and the third pressure plate 31 are arranged oppositely, thus forming a test space for the sample 30.

Based on above description, during actual application, hydraulic telescopic rods are fixedly installed at a top end and left and right sides in the test box 27, and the pressure sensor 6 and the displacement sensor are installed at a top end of each hydraulic telescopic rod, thus achieving uniaxial or biaxial compression test demands.

The test box 27 can provide a hydrogen environment at a pressure and temperature required for testing. During actual application, the highest test pressure of the test box 27 can reach 100 MPa, and a test temperature ranges from −60° C. to 150° C. In addition, a material used for the test box 27 requires good hydrogen embrittlement resistance, and can achieve a sealing function.

Further, in order to ensure that the measurement at a high temperature or a specific temperature can be achieved in the entire test box 27. The heating system provided by the present disclosure includes multiple heating tubes 19. The multiple heating tubes 19 are electrically connected to the upper computer 32. As shown in FIG. 1, the heating tubes 19 are arranged on a box wall of the test box 27.

Further, in order to improve temperature test efficiency of the test box 27 to make the temperature in the test box 27 drop to a set temperature from a high temperature as fast as possible, the cooling system provided by the present disclosure may include a refrigerator. The refrigerator is electrically connected to the upper computer 21, and arranged in the test box 27.

Further, during actual application, the upper computer 32 may be replaced with a processor with a programmable logic controller (PLC) as a core processing module, which is used for coordinated control of various functional modules and hydrogen leakage monitoring. This processor mainly includes a testing, recording and processing system, a leakage monitoring system, etc. The processor can be used to perform data collection and processing on analog data identified by each sensor through A/D conversion, and to display the data on a screen. An operator can take corresponding actions according to the displayed information. Meanwhile, the processor can automatically execute related measures through set determining conditions, such as turning off a gas booster, and triggering an alarm system.

The testing, recording and processing system is used to execute the following operations:

(1) Test parameters acquired by instruments, e.g., the gas pressure sensor, the camera, the temperature sensor, and the pressure sensors, during the test process are measured, recorded, and processed in real time.

(2) Control, accurate measurement and recording of the parameters such as the pressure of each hydraulic telescopic rod, and the compression rate during the compression test of the sample are achieved.

(3) The engineering stress-strain data obtained by testing is subjected to data processing to obtain real stress-strain data of compression stress-strain. The stress-strain transformation formula is as follows: real stress=engineering stress×(1−engineering strain), and real strain=−ln (1−engineering strain).

(4) The obtained real stress-strain data is compared with a database of material mechanical properties to determine the accuracy of the obtained data, and the constitutive model capable of best characterizing the nonlinearity of the sample is screened out through database data processing.

Further, the processor above may also be used to monitor a hydrogen leakage status of the test system in real time and to give an alarm in time, and automatic interlocking emergency stop in emergency situations such as excessive hydrogen leakage can be achieved, thus ensuring the safety of personnel and device.

Further, during actual application, a cooling system and a heating system can form a temperature regulation control system to test the performance of the same sample under different temperatures, thus testing the performance at different environmental temperatures. The temperature sensor can detect the temperature inside the test box 27. When the temperature in the test box 27 is higher than or lower than the set temperature, the temperature sensor is about to transmit an electrical signal. The upper computer 32 (or processor) can control the cooling system or heating system to be turned on and off, thus achieving the regulation and control of temperature from −60° C. to 150° C., and ensuring that the test box 27 is always at the temperature required for testing.

The uniaxial and biaxial compression test of a rubber specimen is used as an example, and the working principle of a wide-temperature-range uniaxial and biaxial compression test device in a high-pressure hydrogen environment provided by the present disclosure will be explained below.

A. Uniaxial compression test is as follows:

Coating is sprayed on a cut rubber specimen (for laser speckling, chemical etching, etc.) to form speckles, the speckles are cured, the rubber specimen is fixed between the first pressure plate 29 and the sample placement end surface 33, and a box door of the test box 27 is closed.

A uniaxial test mode is selected on the upper computer 21, the temperature and hydrogen pressure required for testing are set, a thickness and a compression rate of the rubber specimen and compression speed of the first hydraulic telescopic rod 16 are input, and the test is started under the control.

The test box 27 and a pipeline of the hydrogen filling system are vacuumized by the vacuum pump 14, then the nitrogen manually-operated valve 4 is opened to purge the test box 27 and the gas pipeline, and then the test box 27 and the pipeline of the hydrogen filling system are vacuumized by the vacuum pump 14. The above steps of vacuumizing and purging are repeated until the oxygen content in the test box 27 reaches specified requirements. The hydrogen manually-operated valve 5 is opened to fill hydrogen into the test box 27, and then the test box 27 is subjected to pressure relief, and vacuumized again. The above steps of hydrogen filling, pressure relief and vacuumizing are repeated until the hydrogen purity in the test box 27 meets test requirements. Afterwards, the booster pump 9 is started to boost the pressure in the test box 27 to a set pressure. In this case, the test box 27 is filled with the hydrogen with specified pressure and purity.

Prior to testing, a position of the camera is manually adjusted to acquire an optimal shooting image. At a room temperature, the camera takes 100 images at an appropriate frame rate per second, and the 100 images are collected and stored in the upper computer 32.

The heating tubes start to heat (or the cooling system starts to cool down). After the temperature in the test box 27 reaches the set temperature, the compression test is started according to the test requirements.

The temperature is raised (or lowered) to the test temperature and maintained for 5 minutes. After the temperature in the test box 27 is stabilized, the first hydraulic telescopic rod 16 is started to press down the rubber specimen, making the rubber specimen in a certain compressed state. The pressure and the change of compression amount are reflected through the second displacement/pressure sensor 28. After reaching a preset compression ratio, the first hydraulic telescopic rod 16 stops pressing down, and the second displacement/pressure sensor 28 transmits the tested data to the upper computer 32. The camera shoots 100 pictures at the same rate through the explosion-proof glass, the 100 pictures are collected and stored in the upper computer.

After the test is completed, the tested engineering stress-strain data is processed by the upper computer 32 to obtain real stress-strain data of compression stress-strain. The obtained real stress-strain data is compared with a database of rubber mechanical properties to determine the accuracy of the obtained data, and a constitutive model capable of best characterizing the nonlinearity of the rubber specimen is screened out through database data processing. An obtained strain distribution nephogram is processed, and the change process of the strain nephogram is analyzed to study a deformation behavior and a failure fracture mechanism of the material.

After the compression test is finished, the heating tubes stop heating, the first hydraulic telescopic rod 16 returns to an initial position, the emptying valve 12 is opened to release the pressure in the test box 27, the vacuum pump 14 is used to vacuumize the test box 27. The vacuum pump 14 is turned off after the vacuum degree reaches a set value, and the emptying valve 27 is opened to balance internal and external pressure of the test box 27. After the hydrogen in an inner cavity of the test box 27 is completely exhausted, the box door of the test box 27 is opened to take out the rubber specimen.

B. Biaxial compression test is as follows:

Coating is sprayed on a cut rubber specimen (for laser speckling, chemical etching, etc.) to form speckles, the speckles are cured, the rubber specimen is fixed between the first pressure plate 29 and the sample placement end surface 33, and a box door of the test box 27 is closed.

A biaxial test mode is selected on the upper computer 32, the temperature and hydrogen pressure required for testing are set, a thickness and a compression rate of the rubber specimen and compression speed of the first, the second and the third hydraulic telescopic rods are input, and the test is started under the control.

The test box 27 and a pipeline of the hydrogen filling system are vacuumized by the vacuum pump 14, then the nitrogen manually-operated valve 4 is opened to purge the test box 27 and the gas pipeline, and then the test box 27 and the pipeline of the hydrogen filling system are vacuumized by the vacuum pump 14. The above steps of vacuumizing and purging are repeated until the oxygen content in the test box 27 reaches specified requirements. The hydrogen manually-operated valve 5 is opened to fill hydrogen into the system, and then the test box 27 is subjected to pressure relief, and vacuumized again. The above steps of hydrogen filling, pressure relief and vacuumizing are repeated until the hydrogen purity in the test box 27 meets test requirements.

Afterwards, the booster pump 9 is started to boost the pressure in the test box 27 to a set pressure. In this case, the test box 27 is filled with the hydrogen with specified pressure and purity.

Prior to testing, a position of the camera 22 is manually adjusted to acquire an optimal shooting image. At a room temperature, the camera 22 takes 100 images at an appropriate frame rate per second, and the 100 images are collected and stored in the upper computer 32.

The heating tubes start to heat (or the cooling system starts to cool down). After the temperature in the test box 27 reaches the set temperature, the compression test is started according to the test requirements.

The temperature is raised (or lowered) to the test temperature and maintained for 5 minutes. After the temperature in the test box 27 is stabilized, the first hydraulic telescopic rod 16 is started, the second hydraulic telescopic rod 18 moves rightwards, and the third hydraulic telescopic rod 23 moves leftwards, making the rubber specimen in a biaxial compression state. The pressures and the changes of compression amount are reflected through the second displacement/pressure sensor 28 and the first displacement/pressure sensor 24. After reaching a preset compression ratio, the first hydraulic telescopic rod 16 and the second and third hydraulic telescopic rods stop moving, and the second displacement/pressure sensor 28 and the first displacement/pressure sensor 24 transmit the tested data to the upper computer 32. The camera shoots 100 pictures at the same rate through the explosion-proof glass, the 100 pictures are collected and stored in the upper computer.

After the test is completed, the tested engineering stress-strain data is processed by the upper computer 32 to obtain real stress-strain data of compression stress-strain. The obtained real stress-strain data is compared with a database of rubber mechanical properties to determine the accuracy of the obtained data, and a constitutive model capable of best characterizing the nonlinearity of the rubber specimen is screened out through database data processing. An obtained strain distribution nephogram is processed, and the change process of the strain nephogram is analyzed to study a deformation behavior and a failure fracture mechanism of the material.

After the compression test is finished, the heating tubes stop heating, the first hydraulic telescopic rod 16, the second hydraulic telescopic rod and the third hydraulic telescopic rod return to initial positions, the emptying valve 12 is opened to release the gas in the test box 27 from a gas inlet/outlet pipeline 20 at a gas inlet/outlet 21, thus releasing the pressure in the test box 27. The vacuum pump 14 is used to vacuumize the test box 27, the vacuum pump 14 is turned off after the vacuum degree reaches a set value, the emptying valve 27 is opened to balance internal and external pressure of the test box 27. After the hydrogen in the inner cavity of the test box 27 is completely exhausted, the box door of the test box 27 is opened to take out the rubber specimen.

Based on the above description, the present disclosure has the following advantages compared with the prior art:

(1) Digital image correlation (DIC) used in the present disclosure is a full-field and non-contact displacement and strain measurement technology, which can acquire displacement and strain values according to gray field information of a tested object before and after deformation, thus effectively completing material information acquiring in a wide temperature range.

(2) The test device provided by the present disclosure supports both uniaxial compression test and biaxial compression test, and can simulate compression stress in different directions, which is conducive to comprehensively evaluating the performance of the material. Meanwhile, the test device can complete the material test at the test temperature ranging from −60° C. to 150° C. and the test pressure ranging from 0 MPa to 100 MPa. Through covering a wide temperature and pressure range, the test device can simulate actual working conditions more accurately, and evaluate the performance of the material under extreme conditions, which is crucial for the material research in the fields of hydrogen energy technology, hydrogen storage and transport system and the like.

(3) According to the test device provided by the present disclosure, the tested engineering stress-strain data can be processed to obtain real stress-strain data of the rubber, and the real stress-strain data can be compared with the data in the corresponding database to determine the accuracy of the obtained data. Finally, the data is processed through the database to screen out the constitutive model capable of best characterizing the nonlinearity of the rubber specimen. Meanwhile, a strain distribution nephogram of the sample can be generated according to the test result, and then the change process of the strain distribution nephogram is effectively analyzed to obtain a deformation behavior and a failure fracture mechanism of the sample material.

Various embodiments in this specification are described in a progressive way, and each embodiment focuses on the differences from other embodiments. The same and similar parts between various embodiments can be referred to each other.

Several examples are used for illustration of the principles and embodiments of the present disclosure. The description of the embodiments is merely used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A wide-temperature-range uniaxial and biaxial compression test device in a high-pressure hydrogen environment, comprising a test box, a temperature sensor, a gas pressure sensor, test pressure sensors, displacement sensors, an oxygen/hydrogen concentration monitor, an upper computer, a hydrogen filling system, a vacuum extraction system, and a Digital Image Correlation (DIC) test system, wherein a sample clamping mechanism, a heating system and a cooling system are arranged in the test box;

the upper computer is electrically connected to the temperature sensor, the gas pressure sensor, the test pressure sensors, the displacement sensors, the oxygen/hydrogen concentration monitor, the hydrogen filling system, the DIC test system, the sample clamping mechanism, the heating system, the vacuum extraction system and the cooling system, respectively; the hydrogen filling system is connected to the test box through a pipeline; the temperature sensor, the gas pressure sensor and the oxygen/hydrogen concentration monitor are arranged inside the test box; the vacuum extraction system is connected to the hydrogen filling system and the test box through a pipeline, respectively;

a uniaxial compression test mode and a biaxial compression test mode are implanted in the upper computer; the upper computer is configured to acquire test parameters in the uniaxial compression test mode or the biaxial compression test mode, and to generate a test instruction based on the test parameters; the test instruction is configured to start the hydrogen filling system, the temperature sensor, the gas pressure sensor, the test pressure sensors, the displacement sensors and the oxygen/hydrogen concentration monitor; the test pressure sensors and the displacement sensors are arranged on the sample clamping mechanism;

the hydrogen filling system is configured to fill hydrogen into the test box; the upper computer is configured to generate a hydrogen filling instruction based on a gas pressure in the test box acquired by the gas pressure sensor; the hydrogen filling system is configured to execute the hydrogen filling instruction;

the upper computer is configured to acquire temperature data in the test box acquired by the temperature sensor, and to generate a heating/cooling instruction based on the temperature data; the heating system and the cooling system are configured to execute the heating/cooling instruction until temperature in the test box reaches a set value;

the upper computer is configured to generate a sample clamping instruction based on the test parameters; the sample clamping mechanism is configured to execute the sample clamping instruction; the upper computer is configured to acquire data acquired by the test pressure sensors and data acquired by the displacement sensors, and to determine a compression rate of a sample according to the data acquired by the test pressure sensors and the data acquired by the displacement sensors; when the compression rate of the sample reaches the set value, the upper computer generates a sample clamping stop instruction; the sample clamping mechanism is configured to execute the sample clamping stop instruction;

the DIC test system is configured to acquire sample image data during the test process; the upper computer is configured to determine stress-strain data of the sample based on the sample image data and the data acquired by the test pressure sensors, to obtain a constitutive model for characterizing nonlinearity of the sample by screening from a database based on the stress-strain data, and to generate a strain distribution nephogram of the sample based on the constitutive model, to analyze a change process of the strain distribution nephogram to obtain a deformation behavior and a failure fracture mechanism of a sample material; and the vacuum extraction system is configured to vacuumize the test box;

the hydrogen filling system comprises a nitrogen gas cylinder, a hydrogen gas cylinder, a buffer tank, a first tee joint, and a second tee joint;

the nitrogen gas cylinder is connected to a first interface of the first tee joint through a pipeline; a gas molecular filter and a nitrogen manually-operated valve are arranged on the pipeline between the nitrogen gas cylinder and the first interface of the first tee joint in sequence; the hydrogen gas cylinder is connected to a second interface of the first tee joint through a pipeline, and a gas molecular filter and a hydrogen manually-operated valve are arranged on the pipeline between the hydrogen gas cylinder and the second interface of the first tee joint in sequence; a third interface of the first tee joint is connected to a pipeline of a cooler; the cooler is connected to the buffer tank through a pipeline; a pressure sensor, a pressure gauge, an electromagnetic pneumatic valve and a booster pump are arranged on the pipeline between the third interface of the first tee joint and the cooler in sequence; the buffer tank is connected to a first interface of the second tee joint through a pipeline;

a second interface of the second tee joint is connected to the test box through a pipeline, a further pressure sensor and a further pressure gauge are arranged on the pipeline connecting the second interface of the second tee joint and the test box, and a third interface of the second tee joint is connected to the vacuum extraction system through a pipeline.

2. The wide-temperature-range uniaxial and biaxial compression test device in the high-pressure hydrogen environment according to claim 1, wherein:

the vacuum extraction system comprises a vacuum pump, a third tee joint, and an exhaust port;

a first interface of the third tee joint is connected to the hydrogen filling system through a pipeline;

a second interface of the third tee joint is connected to the vacuum pump through a pipeline, and a manually-operated valve and a vacuum gauge are arranged on the pipeline connecting the second interface of the third tee joint and the vacuum pump in sequence; and a third interface of the third tee joint is connected to the exhaust port through a pipeline; and an emptying valve is arranged on the pipeline connecting the third interface of the third tee joint and the exhaust port.

3. The wide-temperature-range uniaxial and biaxial compression test device in the high-pressure hydrogen environment according to claim 1, wherein:

the DIC test system comprises a camera, and an illuminating lamp;

the camera is electrically connected to the upper computer;

the camera is configured to shoot the sample image data during the test process; and the illuminating lamp is configured to provide an illuminating environment for the camera.

4. The wide-temperature-range uniaxial and biaxial compression test device in the high-pressure hydrogen environment according to claim 3, wherein an optical filter is arranged in front of a lens of the camera.

5. The wide-temperature-range uniaxial and biaxial compression test device in the high-pressure hydrogen environment according to claim 3, wherein:

an observation window is formed on the test box, the observation window being encapsulated by explosion-proof glass; and the camera is configured to shoot the sample image data during the test process through the observation window.

6. The wide-temperature-range uniaxial and biaxial compression test device in the high-pressure hydrogen environment according to claim 1, wherein:

the sample clamping mechanism comprises a first hydraulic telescopic rod, a second hydraulic telescopic rod, a third hydraulic rod, and a sample stage;

the first hydraulic telescopic rod, the second hydraulic telescopic rod and the third hydraulic rod are electrically connected to the upper computer;

each of the first hydraulic telescopic rod, the second hydraulic telescopic rod and the third hydraulic rod is provided with a corresponding one of the test pressure sensors and a corresponding one of the displacement sensors;

an end of the first hydraulic telescopic rod is fixed to the test box, and a first pressure plate is arranged on another end of the first hydraulic telescopic rod;

an end of the second hydraulic telescopic rod is fixed to the test box, and a second pressure plate is arranged on another end of the second hydraulic telescopic rod;

an end of the third hydraulic telescopic rod is fixed to the test box, and a third pressure plate is arranged on another end of the third hydraulic telescopic rod;

an end of the sample stage is fixed to the test box, and a sample placement end surface is formed on another end of the sample stage; the first pressure plate and the sample placement end surface are arranged oppositely; and the second pressure plate and the third pressure plate are arranged oppositely.

7. The wide-temperature-range uniaxial and biaxial compression test device in the high-pressure hydrogen environment according to claim 1, wherein the heating system comprises a plurality of heating tubes, the plurality of heating tubes are electrically connected to the upper computer, and the heating tubes are arranged on a box wall of the test box.

8. The wide-temperature-range uniaxial and biaxial compression test device in the high-pressure hydrogen environment according to claim 1, wherein the cooling system comprises a refrigerator, the refrigerator is electrically connected to the upper computer, and the refrigerator is arranged inside the test box.

* * * * *